Figure 1:
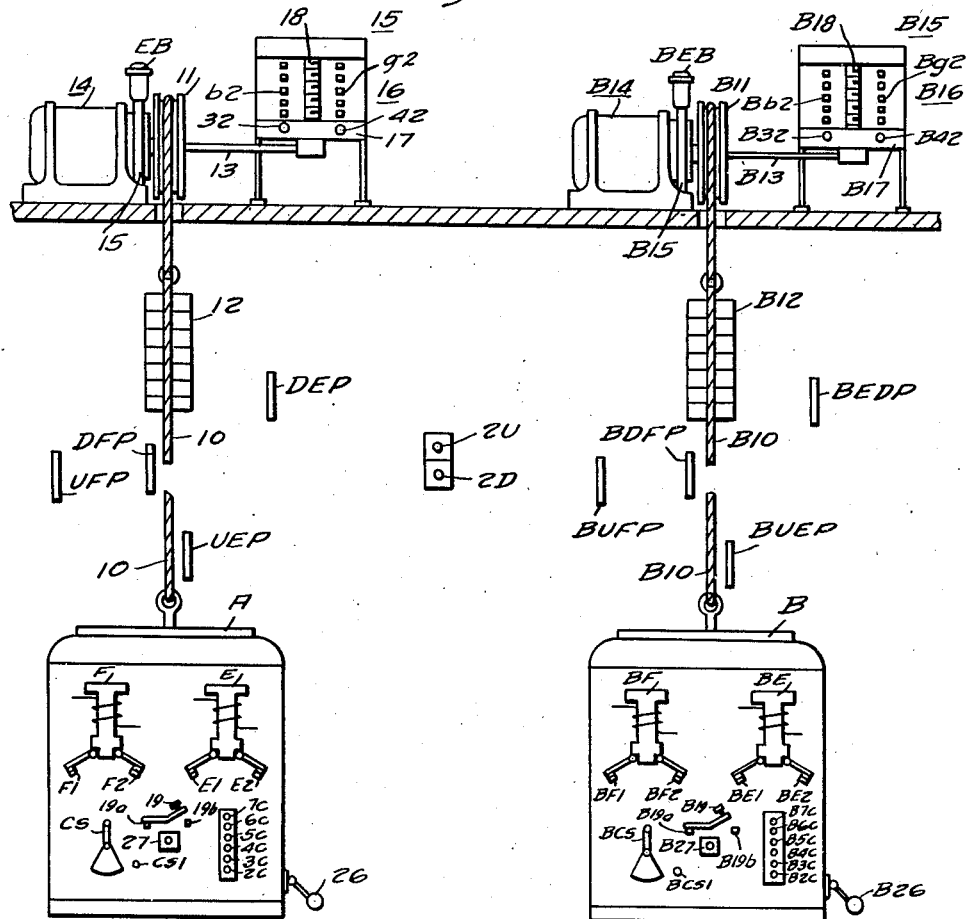

May 15, 1945.　　　H. W. WILLIAMS ET AL　　　2,376,218
SELECTIVE HIGH CALL REVERSAL
Filed July 8, 1942　　　9 Sheets-Sheet 1

WITNESSES:
E. G. McCloskey
Birney Hines

INVENTORS
Harold W. Williams,
Danilo Santini and Mark L. Mount.
BY
ATTORNEY

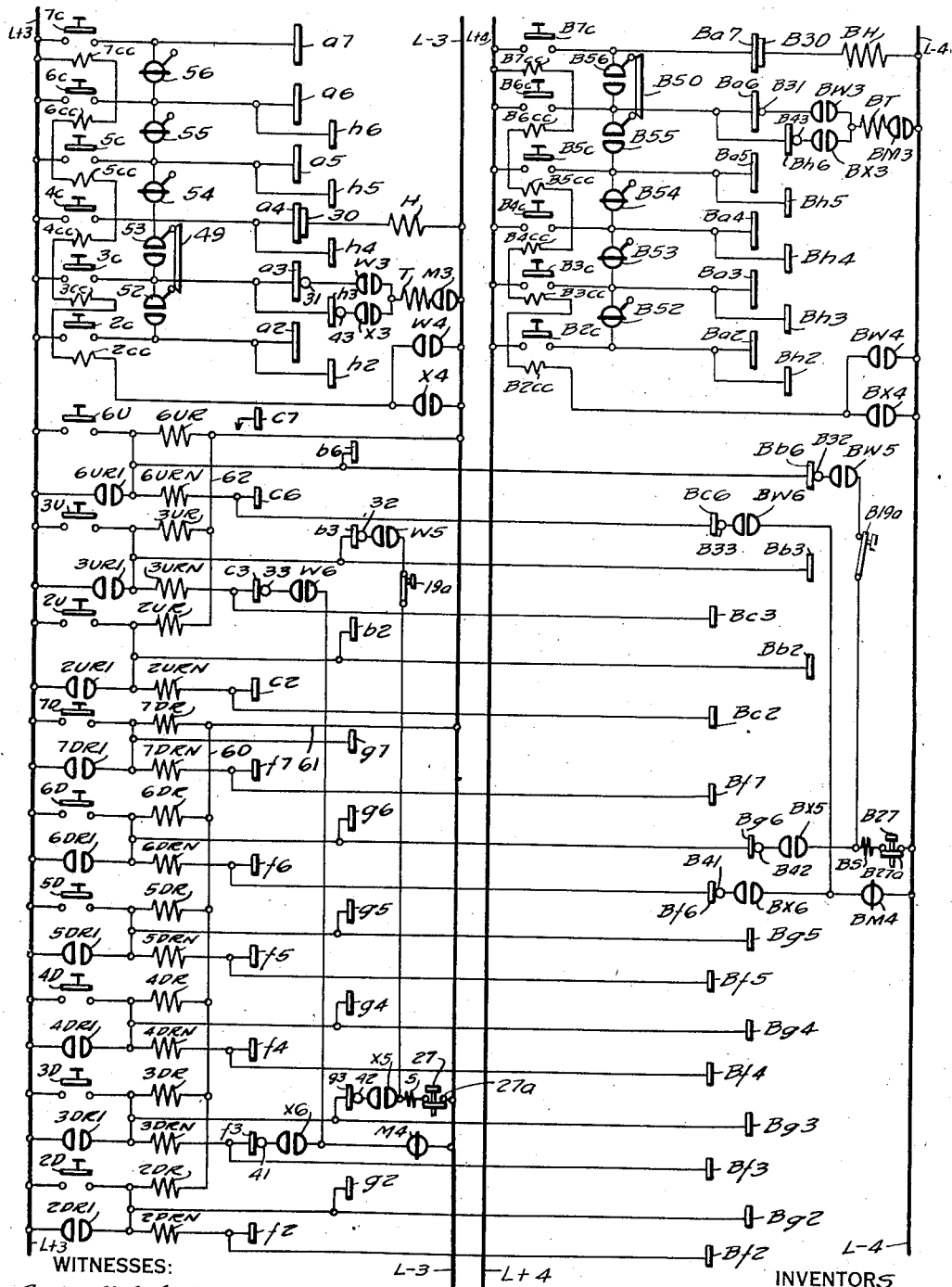

Patented May 15, 1945

2,376,218

UNITED STATES PATENT OFFICE 2,376,218

SELECTIVE HIGH CALL REVERSAL

Harold W. Williams, Nutley, Danilo Santini, Tenafly, and Mark L. Mount, Westfield, N. J., assignors, by mesne assignments, to Westinghouse Electric & Manufacturing Company, East Pittsburgh, Pa., a corporation of Pennsylvania Application July 8, 1942, Serial No. 450,110

15 Claims. (Cl. 187—29)

Our invention relates to systems of control for electric elevators and more particularly to such systems as include a number of elevator cars, operating together as a bank, and are controlled by passenger-operated push buttons located at the various floor landings.

Although not limited thereto, our invention is particularly applicable to elevator systems in which the elevator cars are driven at relatively high speeds by variable-voltage or other high-speed motive equipment and are automatically stopped at the floors by automatic landing equipment or equivalent apparatus. Such elevator systems provide a particularly efficient passenger service available for office buildings and other tall structures having a large number of floors and a relatively large volume of passenger traffic.

In such systems, in the absence of special control provisions which will be described, there is a tendency for the various cars to distribute the building traffic unevenly, and, in the taller buildings, for the cars to become "bunched" and thus prevent reasonable uniformity of spacing between them.

These systems also tend to provide better service at certain floors than at others, particularly during the noon and evening rush periods, at which times a relatively large number of calls are registered at practically all floors of the building within a relatively short period of time. At such rush periods, each car is filled to capacity by a relatively few stops, perhaps three or four. Considering a car leaving the upper terminals, such a car is usually required to make these few stops at the upper floors and so passes the lower floors without stopping. Because of the frequency with which calls are registered, the next car of the series is also filled to capacity by three or four stops at upper floors and so passes the lower floors without stopping. In the operation of these systems, therefore, the response to calls registered from lower floors of the building is delayed until most of the traffic from the upper floors has received attention.

In order to provide more uniform service throughout the building during heavy traffic peaks, we have devised a selective system for operating the elevators in which a car may be reversed automatically in any part of its shaft travel if conditions exist which require its reversal for the best service. An up traveling car with passengers should not be reversed until the passengers have been discharged, and a car should not be reversed unless there is sufficient demand at the lower floors of the building to require practically its full capacity. Otherwise the service in some other portion of the building may suffer.

Our system will provide normal service to the entire building as long as the demands on the system are normal. In this normal service each car runs to the highest call before reversing. In the evening when the building is being emptied, this highest call will usually be a down floor call.

As the demand for service becomes heavier, the upper floors of the building will tend to monopolize it and the lower floors will not receive sufficient service. When this conduition occurs, the number of calls registered at the lower floors will increase. When these have reached a predetermined number, one of the cars will reverse at the highest down call occurring in a "lower zone" which comprises a selected number of the lower floors of the building, and it will serve these lower floors at the expense of the service at the upper floors. By a proper choice of division between upper and lower floors and by requiring certain of the cars to travel to the highest down call of the upper floors by making it incapable of lower zone reversal, a balance can be obtained where all floors will receive substantially equal service.

It is, therefore, an object of our invention to provide a novel elevator system for equalizing the service rendered to the floors, particularly during a period of high service demand.

A further object is to provide means for rendering service to the lower portion of the floors served by a bank of elevators without making an arbitrary division served by certain cars regardless of the requirements.

Another object is to provide a system which will send a car to serve the lower floors, when the service demands it, as quickly as possible and yet without wasting elevator capacity in doing this, and when it happens that demand for service at the lower floor zone may arise after the car capable of rendering such service has moved upward out of the lower zone, then that car will reverse at the next down call and at once proceed to the lower zone to relieve the accumulated demand.

Figure 2:
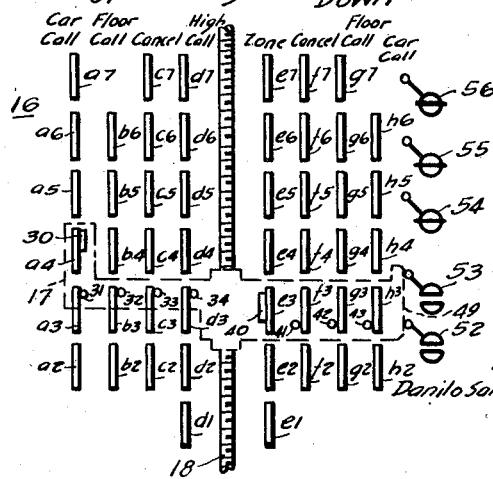

Other objects of our invention will become evident from the following detailed description taken in conjunction with the accompanying drawings, of which:

Figure 1 is a diagrammatic representation of an elevator system embodying our invention, Fig. 2 is a diagrammatic representation of the stationary contact segments and the moving brushes on a floor selector for one of the elevator cars embodied in Fig. 1, with the brushes disposed in the position they take when the car is stopped at the third floor;

Figs. 3, 4, 5 and 6 collectively constitute a diagrammatic representation in straight-line style of the circuit connections for the two-car elevator system illustrated in Fig. 1. The figures should be assembled vertically in numerical order with Fig. 3 at the top.

Figs. 3A to 6A, inclusive, are key representations of the relays in Figs. 3 to 6, inclusive, illustrating the coils and contact members disposed in horizontal alignment with their positions in the straight-line circuits of Figs. 3 to 6. Figs. 3A to 6A should be placed beside the corresponding Figs. 3 to 6 to facilitate the location of the various coils and contacts.

The elevator system illustrated is provided with two cars A and B for serving seven floors. This number of cars and this number of floors have been selected for the purpose of simplifying the disclosure as much as possible, but it is to be understood that the invention may be used for any reasonable number of cars in a bank serving any reasonable number of floors. For example, the invention would be suitable for an installation of six cars serving thirty floors.

For the sake of simplicity, the apparatus individual to each car will be given the same reference characters except that the apparatus for car B will be given the prefix B to indicate that it is for car B instead of for car A.

*Apparatus individual to car A*

D—down switch
E—slow-down inductor relay
F—stopping inductor relay
G—inductor holding relay
H—high car call relay
J—high call reversing relay
K—high floor call relay
KN—no floor call relay
M—car running relay
P—inductor plates
R—resistors
S—floor call stopping relay
T—car call stopping relay
U—up direction switch
V—high speed relay
W—up direction preference relay
X—down direction preference relay
Y—quota adjusting relay
Z—limiting relay
TR—zone transfer relay
DR—door relay

*Apparatus common to both cars*

7DR, 6DR, 5DR, 4DR, 3DR, 2DR — Down call-storing relays, common to all cars

6UR, 5UR, 4UR, 3UR, 2UR — Up call-storing relays, common to all cars

Q—quota relay

Attention is directed to the fact that some of the features illustrated and described in this application are illustrated, described and claimed in the copending application of E. M. Bouten and D. Santini, filed July 4, 1942, Serial No. 449,716, and assigned to the Westinghouse Electric Elevator Company.

*Apparatus in Fig. 1 of the drawings*

Referring more particularly to Fig. 1 of the drawings, it will be observed that car A is arranged to be supported in a hatchway by a cable 10 which passes over a sheave 11 to a counterweight 12. The sheave 11 is mounted for rotation by a shaft 13 driven by a motor 14. A brake 15 of the usual spring-operated, electromagnetically-released type is provided for stopping further rotation of the sheave 11 when the motor 14 is deenergized.

A floor selector 16, of any suitable type, is provided for connecting the various electrical circuits of the system in accordance with the position of car A. The shaft 13 is extended to operate a brush carriage 17 on the floor selector 16 by mechanically rotating a screw-threaded shaft 18 on which the carriage is mounted. The carriage 17 is provided with a number of brushes which are disposed, upon movement of the car, to successively engage stationary contacts arranged in rows on the selector in position to correspond to the floors of the building. For simplicity, only two brushes, 32 and 42, and two rows of contact segments, b2 and g2, etc., disposed to be engaged by them are illustrated in Fig. 1, but it will be understood that in the system to be described herein, as well as in practice, a much larger number of brushes and rows of contact segments is required. Other forms of selectors may be substituted for the selector shown, if desired.

A starting switch CS is mounted in the car to be operated by the attendant to start the car. When the car switch is rotated anticlockwise, it closes its contacts CS1 to start the car for the direction for which it is conditioned to operate. When the car switch is centered, it leaves the control system of the car in such condition that the car can be stopped by operation of hall buttons at the floor landings or stop buttons in the car. It is to be understood that the car may be operated by the car switch or that any suitable control means may be substituted for the car switch. The illustration of the car switch is used for simplicity in describing the system.

The car buttons 2c, etc. (one for each floor) are mounted in the car, so that the attendant may, by operating them, cause the car to stop automatically at any floor. The direction of operation of the car is controlled by relays W and X as will be described in connection with Fig. 3.

The hall buttons are mounted at the floor landings, in order that waiting passengers may cause the cars to stop thereat. An up button and a down button are provided at each floor intermediate the terminals. A down button is disposed at the top terminal and an up button at the bottom terminal. Fig. 1 illustrates only the up hall call button 2U and the down hall call 2D for the second floor.

In order to automatically effect accurate stopping of car A at the floors in response to operation of the stopping buttons 2C, etc., in the car, or by operation of the hall call buttons 2U, 2D, etc., at the floor, a slow-down inductor relay E and a stopping inductor relay F are mounted on the car in position to cooperate with suitable inductor plates of iron or other magnetic material, mounted in the hatchway adjacent to each floor. Only the up plates UEP and UFP and the down plates DEP and DFP for the second floor are illustrated. Similar plates are provided for each floor, except that the top terminal has only up plates and the bottom terminal only down plates.

The inductor relays E and F, when their coils are energized, have normally incomplete magnetic circuits which are successively completed by the inductor plates as the car approaches a floor at which a stop is to be made. These relays are so designed that energization of their operating coils will not produce operation of their contacts until the relay is brought opposite its inductor plate, thereby completing the relay magnetic circuit. Upon operation of the relay contacts (such as E1 or E2) they remain in operated condition until the relay operating coil is de-energized, even though the inductor relay moves away from the position opposite the inductor plate which completed its magnetic circuit. The plates should be so spaced in the hatchway as to provide desirable distances for slowdown and stopping of the cars at the floors. Other methods of controlling slowing down and stopping of the car may be used if so desired.

In the present system, which is given as an example of how the invention may be utilized, the various control circuits are so connected that the system will operate with a low zone or lower group of floors including the first, second, third, fourth and fifth floors and a high zone or high group of floors including the sixth and seventh floors. Floor one is considered as the parking floor. The division between the two zones of floors is determined by making certain wiring connections with a low zone circuit 51, as will be described later in connection with Fig. 5.

The cars and their control apparatus are provided for operation, under normal conditions, as a high call reversal system in which the cars stop for up calls on their up trips but automatically stop and reverse at the highest down call when there is no service required above that highest down call. If the car attendant desires, for any reason, to go above the highest down call while on an up trip he can do so by pressing a car call button, 6c, etc., for a floor above to cause the car to keep on up to such floor. However at certain peak periods in down travel the system is adjusted or set to cause selected cars to serve down calls in the lower floors when they exceed a predetermined number.

Each car has a double throw zoning switch (19 in car A) by means of which it may be conditioned for operation as a low zone car or for operation as a high zone car.

When switch 19 is in its high-zone car position, its contacts 19a (Fig. 4) in the up stopping circuit are closed so that the car will answer up calls, and its contacts 19b (Fig. 6) are open to prevent operation of its limiting relay Z and its quota-adjusting relay Y. When switch 19 is in its low-zone car position, its contacts 19a are open to prevent the car from answering up floor calls and its contacts 19b are closed to permit operation of the relays Z and Y to make the car a low zone car which will not normally go to the upper terminal; that is, it will answer only down calls in the low zone when they exceed a predetermined number but will go above that zone to answer a down call or down calls when the down calls in the low zone do not exceed that predetermined number. Thus the cars may be divided into two groups as desired so that the cars selected for the high zone group will run to the highest floor call of the upper zone before reversing and may stop for down floor calls in the lower zone on down trips and the cars selected for the low zone group may go to the upper zone but will not go to the upper zone and will answer only down calls, in the lower zone, when the conditions require this response. Obviously, low zone cars do not take on "up" passengers at the lower terminal and do not answer up calls and up passengers must wait for high zone or through trip cars.

In accordance with our invention, a push-button switch 27 is provided in car A to permit the attendant to by-pass the calls ahead of his car when it is loaded or whenever the attendant desires to operate the car straight through. When switch 27 is pressed to by-pass calls, it opens its contacts 27a (Fig. 4) to prevent the car answering calls and it also opens its contacts 27b (Fig. 6) to prevent operation of the relays Z and Y in the low-zone system, so that it will not affect the quota count of calls even if it happens to be a low zone car at the time.

*Apparatus in Fig. 2*

Fig. 2 illustrates an enlarged view of the floor selector 16 of Fig. 1. In this figure, the various stationary contact segments are represented by rectangles and the contacting brushes by small circles. The brush carriage 17 is shown by dotted lines in the position it occupies when the associated car is stopped at the third floor.

The contact segments $a2$ to $a7$ on the floor selector are disposed to be successively engaged by the brush 30 to control the high car call relay H and by the brush 31 for completing stop circuits set up by the call push buttons in the car for up direction stops. The brush 30 should be long enough to bridge adjacent contact segments.

The contact segments $b2$ to $b6$ and the brush 32 are for connecting the circuits of the stop buttons 2U, etc., at the floor landings for up stops. The up contact segments $c2$ to $c7$ and the brush 33 are provided for connecting circuits for cancelling stop calls registered by the up hall call buttons 2U, etc. The up contact segments $d1$ to $d7$ and the brush 34 connect circuits for the high call relay to be described later. The contact segments $e2$ to $e7$ and the brush 40 connect circuits for limiting relays to be described later. The down cancel contact segments $f2$, etc., and brush 41, the down floor call contact segments $g2$, etc., and brush 42, and the down car call contact segments $h2$, etc., and brush 43 are provided for connecting circuits for the down direction in the same manner as described for the up direction.

On the right-hand side of the floor selector, a series of switches 52 to 56 are illustrated as disposed to be operated by a cam 49 on the carriage 17 as it moves from its floor to floor position, for the purpose of controlling a high car call circuit.

Figure 3:
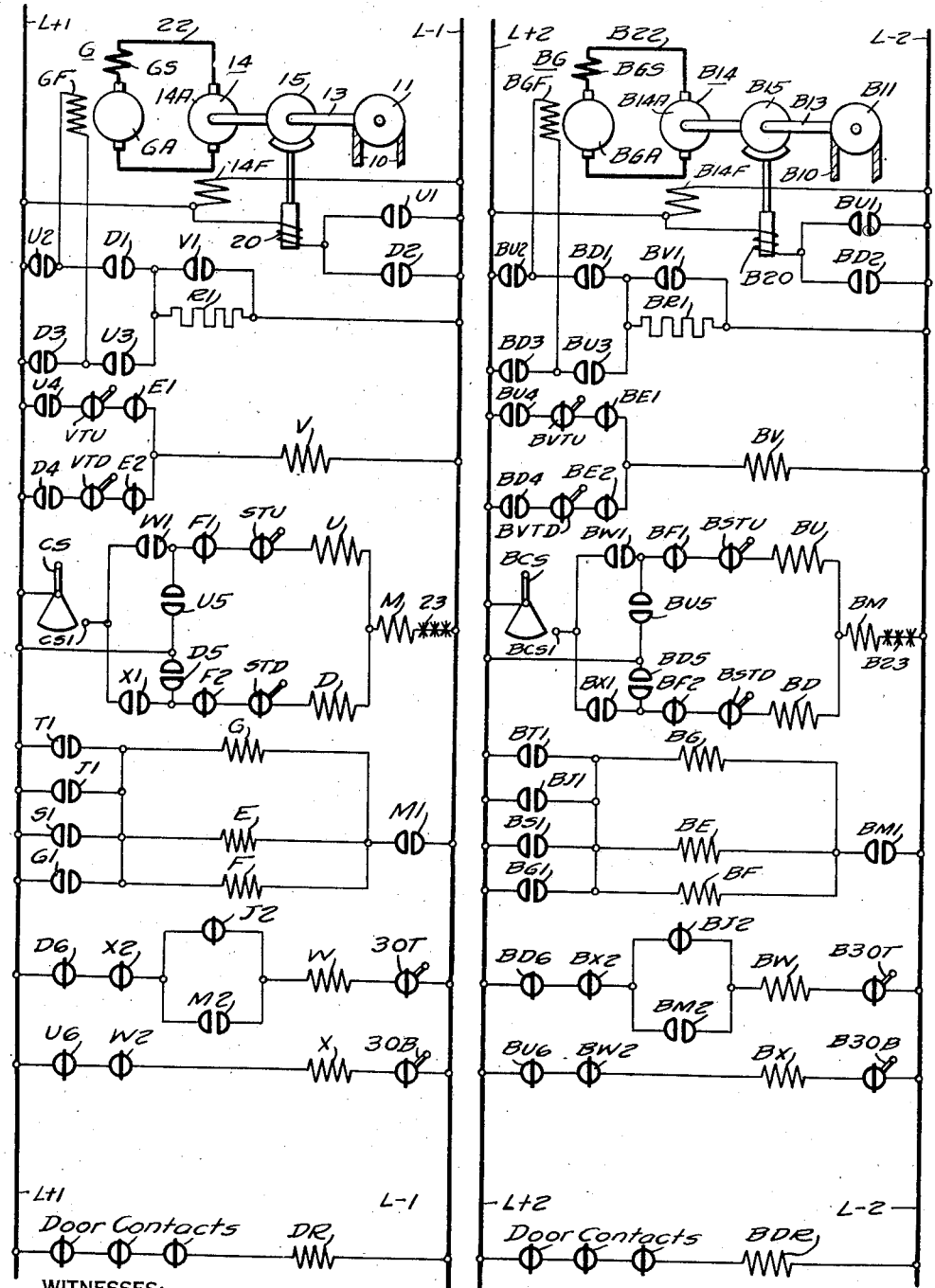
Figure 3A:
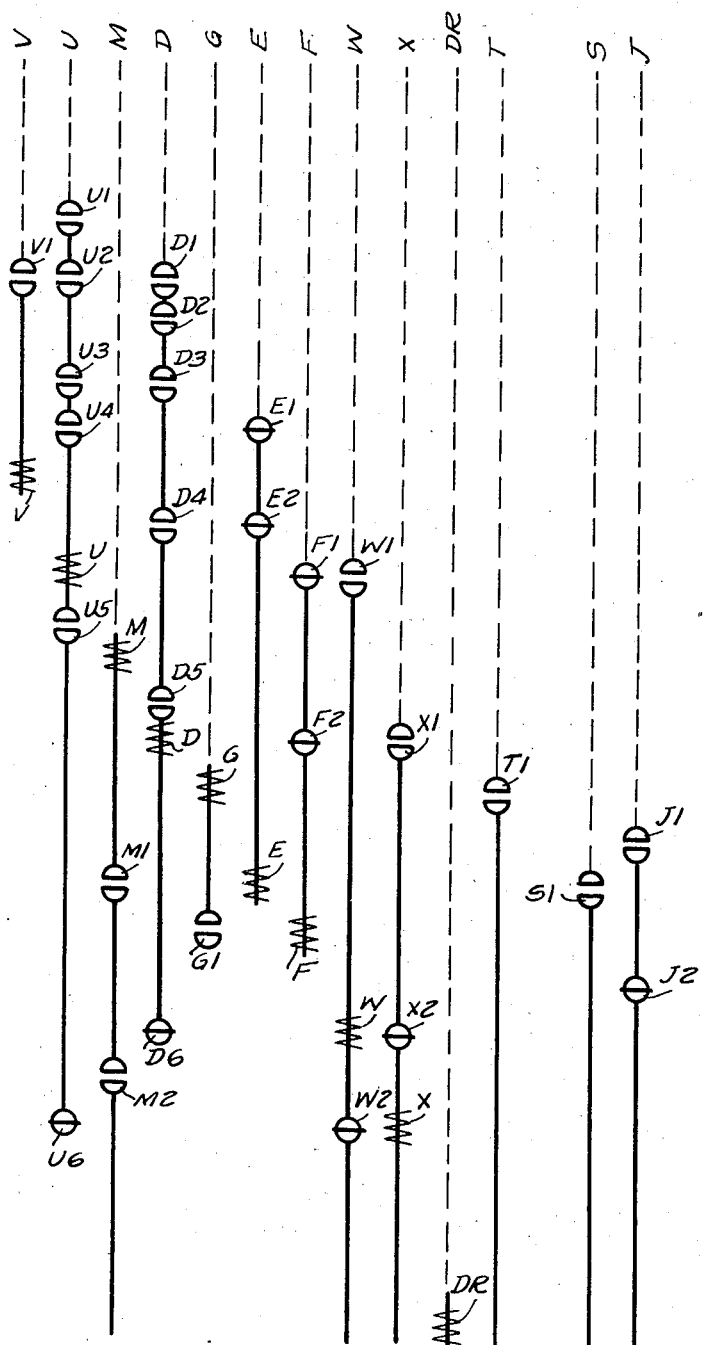

*Apparatus in Fig. 3*

Referring particularly to Fig. 3 of the drawings, it will be observed that control circuits are shown on the left-hand side which are individual to car A. At the right-hand side, the circuits shown are individual to car B.

As shown, the motor 14 is provided with an armature 14A which is mechanically connected to the shaft 13 for driving the sheave 11. The brake 15 is provided with a winding 20 which is energized on energization of the motor 14. The motor 14 includes the usual shunt-type main field winding 14F, which is connected for energization across the supply conductors L—1 and L+2. The armature 14A is connected for energization by a loop circuit 22 to a generator G which is provided with an armature GA.

In order to control the direction and magnitude of the voltage generated by the generator armature GA, a separately-excited main field winding GF is provided for the generator G. A field resistor R1 is included in the circuit of the field winding GF to provide speed control for the motor 14. The generator G is provided with suitable means such as a series field winding GS for correcting the speed regulation of motor 14.

The master switch CS located in car A is here shown connected to control the energization of the operating windings of an up reversing switch U and a down reversing switch D. The reversing switches U and D are provided with contact members for connecting the generator field winding GF to the conductors L—1 and L+1 in accordance with the direction in which it is desired to operate the car. When either the up or the down reversing switch U or D is energized, the car running relay M is also energized to condition certain circuits for operation. The common circuit of the reversing switches U and D and the running relay M includes the usual safety devices indicated diagrammatically at 23.

A high-speed relay V is provided for short-circuiting the resistor R1 disposed in series circuit relation with the generator field winding GF for applying the maximum voltage to that winding when the car is operating at normal high speed. This relay is controlled by the switches U and D on starting and by the slowdown inductor relay E when stopping.

An upper and a lower mechanical limit switch VTU and VTD, are provided for interrupting the circuit of the high-speed relay V when the car reaches a proper slowdown point in advance of the upper and lower terminals, respectively, and an upper and a lower stopping limit switch STU and STD, are provided for opening the circuits of the reversing switches U and D at the terminal limits, in accordance with the usual practice.

An up direction preference relay W and a down direction preference relay X are provided for controlling the direction of operation of the car and performing certain functions in connection therewith. The operating windings of these relays are controlled by a top limit switch 30T, a bottom limit switch 30B and the high-call reversal relays. Each of the limit switches 30T and 30B is arranged to be opened when car A arrives at the corresponding terminal, thereby interrupting the circuit of the direction preference relay W or X corresponding to the direction of operation of the car. Also when the high call reversal relays operate while the car is between terminals, the relays W and X are operated to reverse the direction switches. Hence the car attendant does not need to do anything except close or open the car switch CS and operate the car call buttons.

Figure 6:
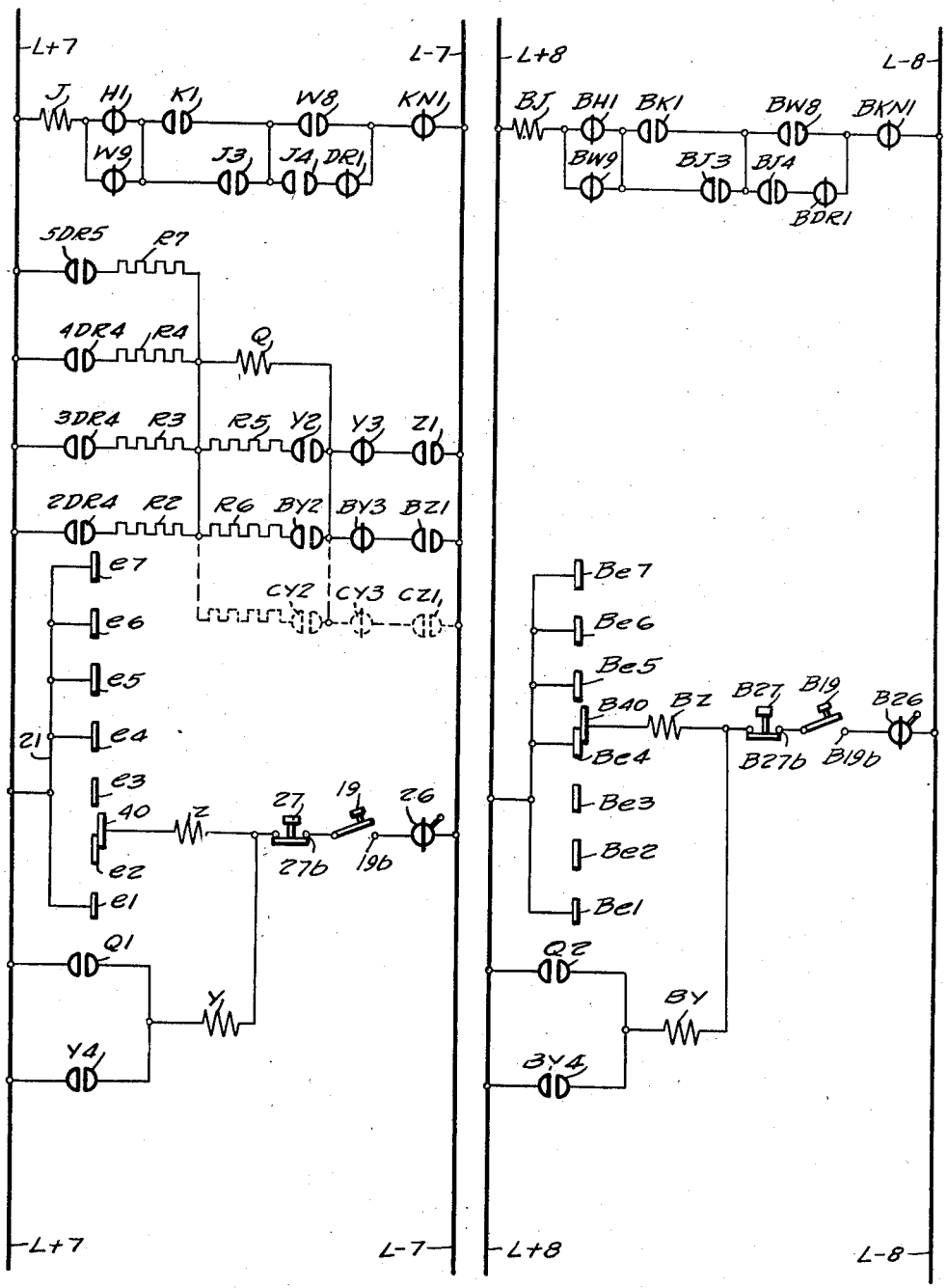
Figure 6A:
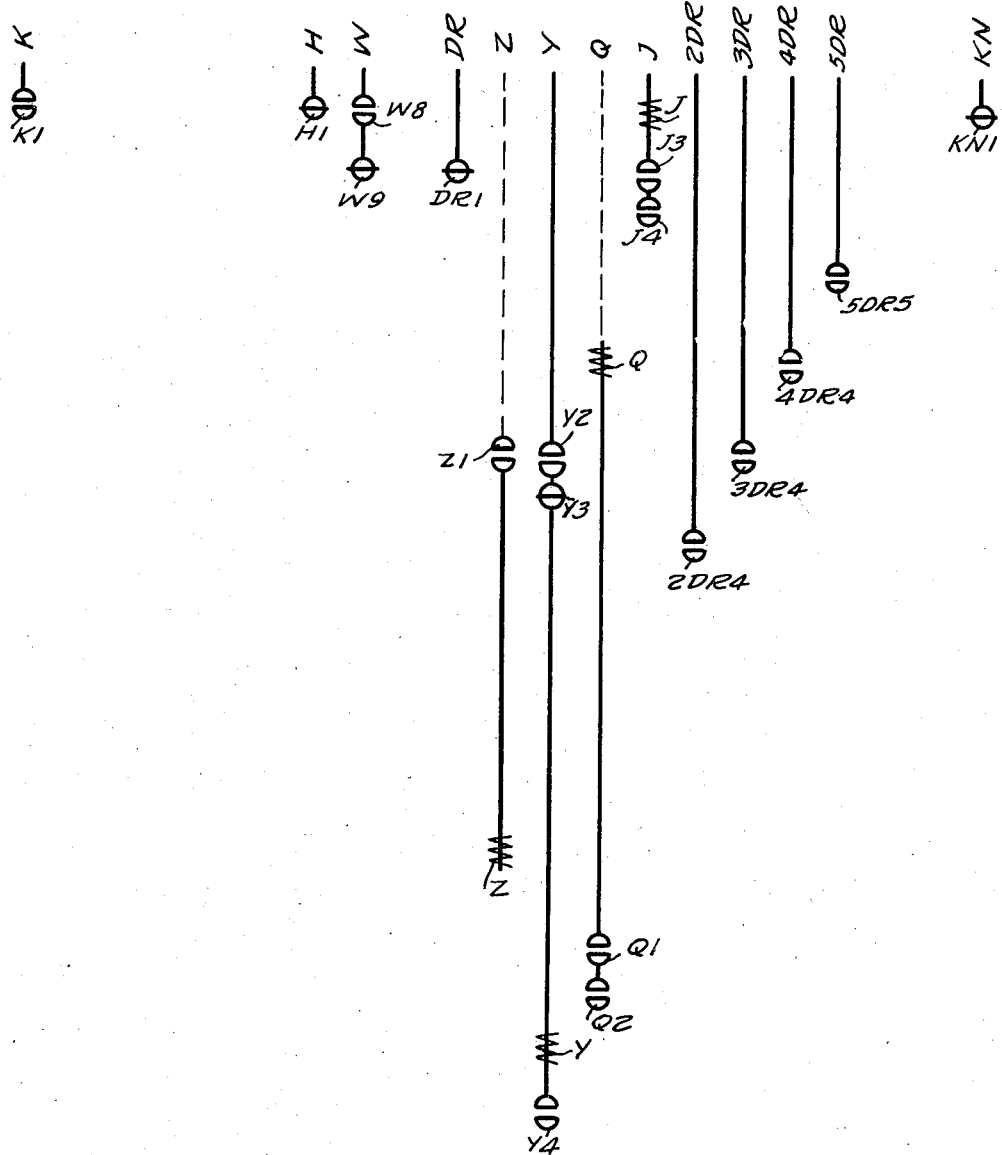

The energizing coils for the slowdown inductor switch E and the stopping inductor switch F, are illustrated in this figure as arranged to be energized on operation of the contacts S1 of a hall call stopping relay S, the contacts T1 of a car button relay T or the contacts J1 of a high call reversing relay J. (The operating coils for relays S and T are illustrated in Fig. 4 and the coil for relay J is illustrated in Fig. 6 and will be described in connection therewith.)

An inductor holding relay G is provided for maintaining the inductor relays in energized condition during a decelerating or stopping operation.

A door relay DR is illustrated as controlled by a plurality of door safety contacts. The relay DR may be used for various safety circuits, and it is also used for assisting in the control of the high call reversing relay J shown in Fig. 6.

Figure 4A:
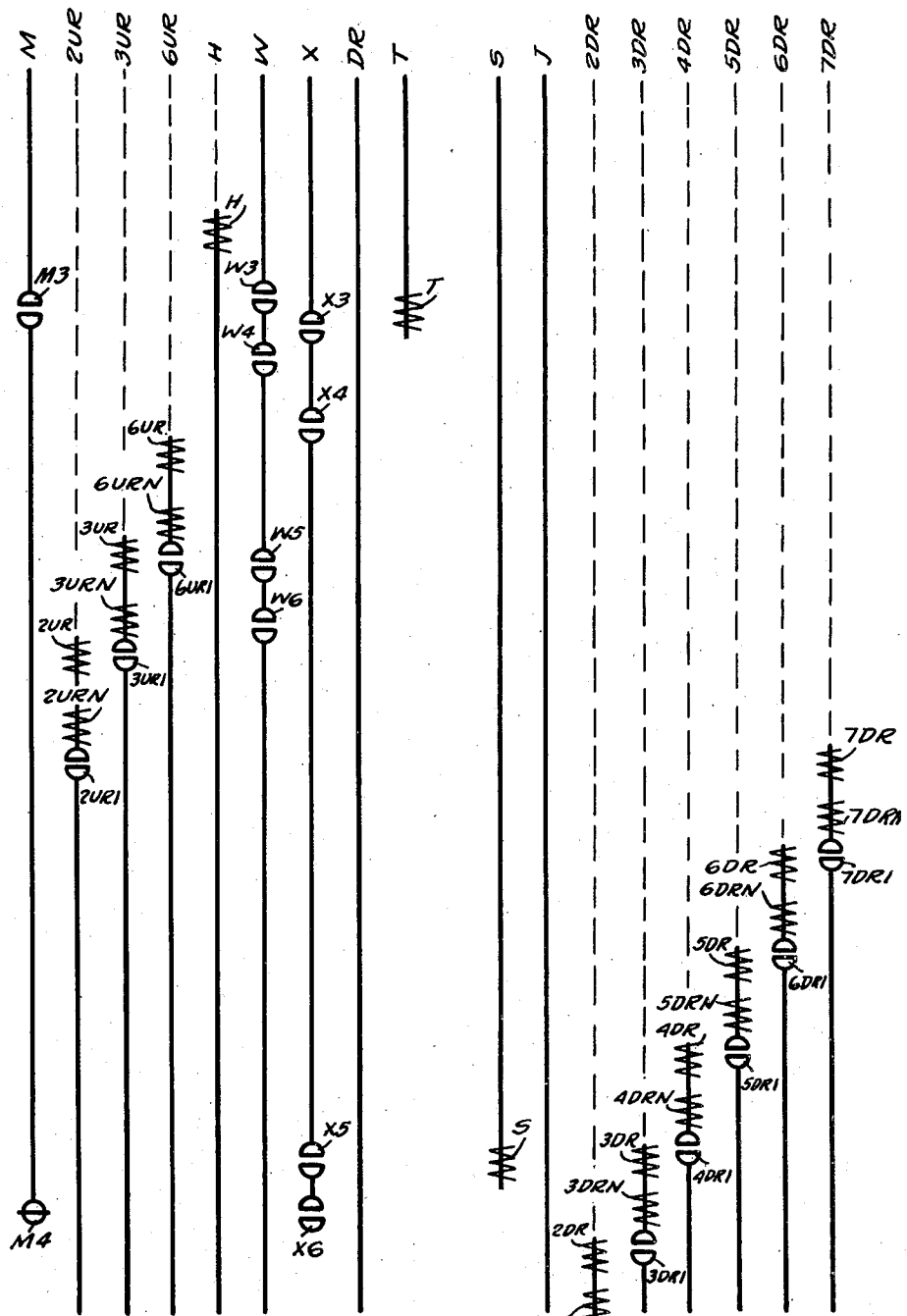

*Apparatus in Fig. 4*

The car buttons 2c, etc., described in connection with Fig. 1, are illustrated with their holding coils 2cc, etc., and circuit in the upper part of Fig. 4, in connection with the high car call relay H and the stopping relay T. The coils 2cc, etc., are energized when the car starts in either direction to hold in the car buttons 2c, 3c, etc., as they are operated, until the direction of the car is reversed, so that the temporary operation of a car button by the attendant will cause it to remain in operated condition until the car is reversed.

The high car call relay H is used to prevent relay J (Fig. 6) from reversing the car at the highest registered floor call when a stop call for a floor above is registered on the stop buttons in the car. It is connected by brush 30 to the row of contact segments $a2$, etc., on the floor selector 16, so that it will be energized whenever a stop call is registered on one of the stop buttons in car A for a floor above the car. The switches 52, 56, inclusive, operated by the cam 49, are shown as disposed in the circuits of the car buttons to prevent energization of the relay H by operated stop buttons in car A for floors below that car.

The car stopping relay T is connected to the up brush 31 engaging the row of contact segments $a2$, etc., and to the down brush 43 engaging the row of contact segments $h2$, etc.; so that, when a call is registered on a car button and the car approaches the energized contact segment corresponding thereto, relay T will be energized to stop the car by energizing the inductor relays F and E.

The floor buttons 2U, 2D, etc., described in connection with Fig. 1 are shown with their circuits in the lower part of Fig. 4. Associated with each floor button is a call registering or storing relay by means of which the momentary pressing of the button will set up or register a stop call which will hold itself until it is answered by the stopping of a car at that floor for the direction of the registered call. The call registering relays are designated as 2DR to 7DR for the down direction and as 2UR, 3UR and 6UR for the up direction. For simplicity, the up direction registering relays and floor buttons for only the second, third and sixth floors are shown, as the up buttons and registering relays for the other floors will be readily understood.

The down call registering relays, when energized, close circuits to the row of contact segments $g2$, etc., and the up registering relays, when energized, close circuits to the row of contact segments $b2$, etc., on the floor selector so that the contact segment for a floor for which a call is registered is energized as long as the call exists.

A car stopping relay S is shown as connected to the up brush 32 engaging segments $b2$, etc., and the down brush 42 engaging segment $g2$, etc. When the car approaches a floor in a direction for which a call is registered, the corresponding brush engages the energized contact segment for that floor and that direction and thereby causes the relay S to be energized, which, in turn, energizes the inductor relays F and E of that car to effect the stopping of that car at that floor.

A cancellation coil is wound in opposition to each call registering coil and connected to the cancellation contact segments on the floor selector. The up cancellation coils are designated as 2URN, etc., connected to the up segments c2, etc., and the down cancellation coils as 2DRN, etc., connected to the down segments f2, etc. As the brush 33 moves over the segments c2, etc., and the brush 41 moves over the segments f2, etc., they energize the cancellation coil for any floor at which the car stops to answer a stop call.

Figure 5:
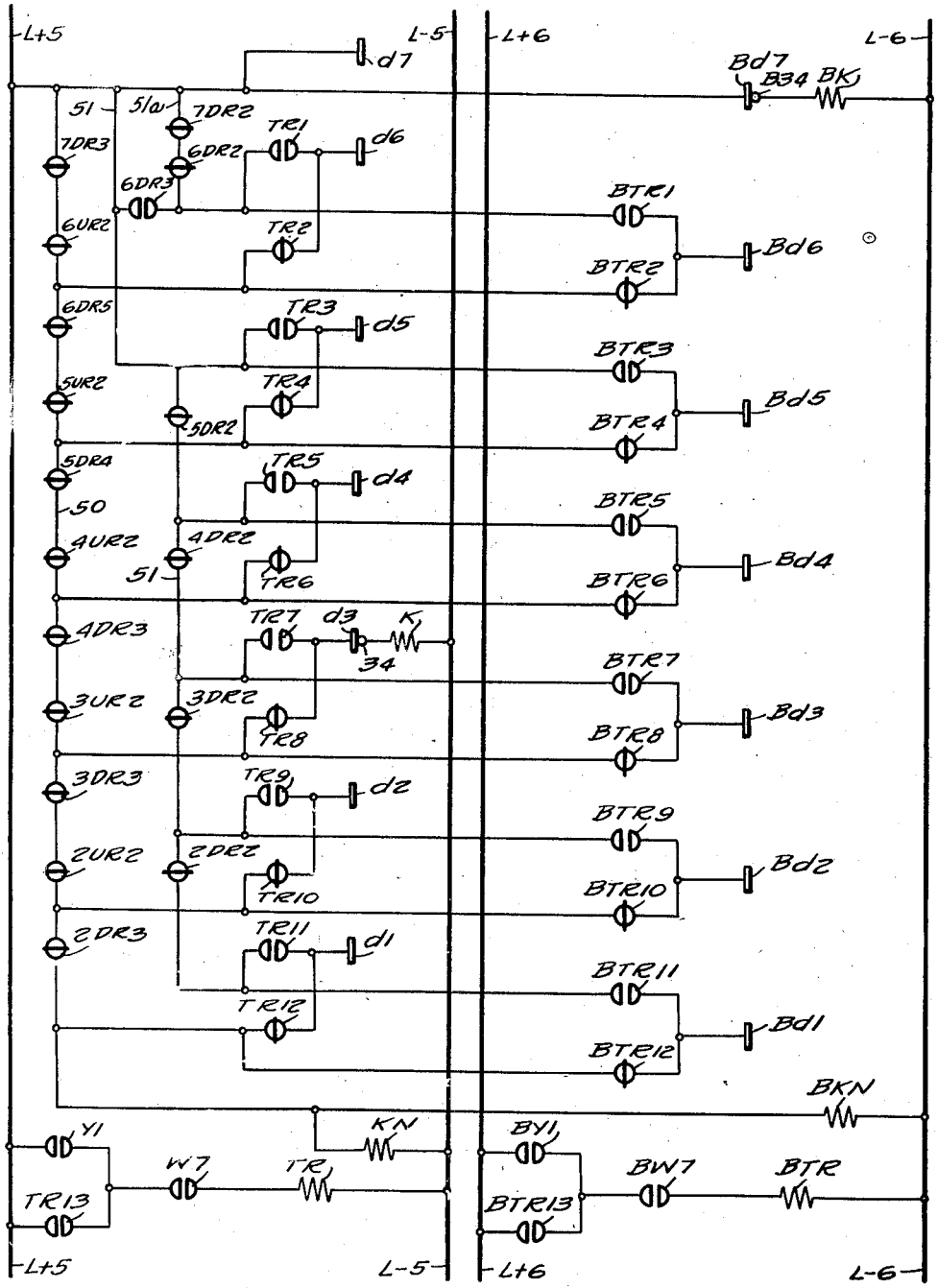
Figure 5A:
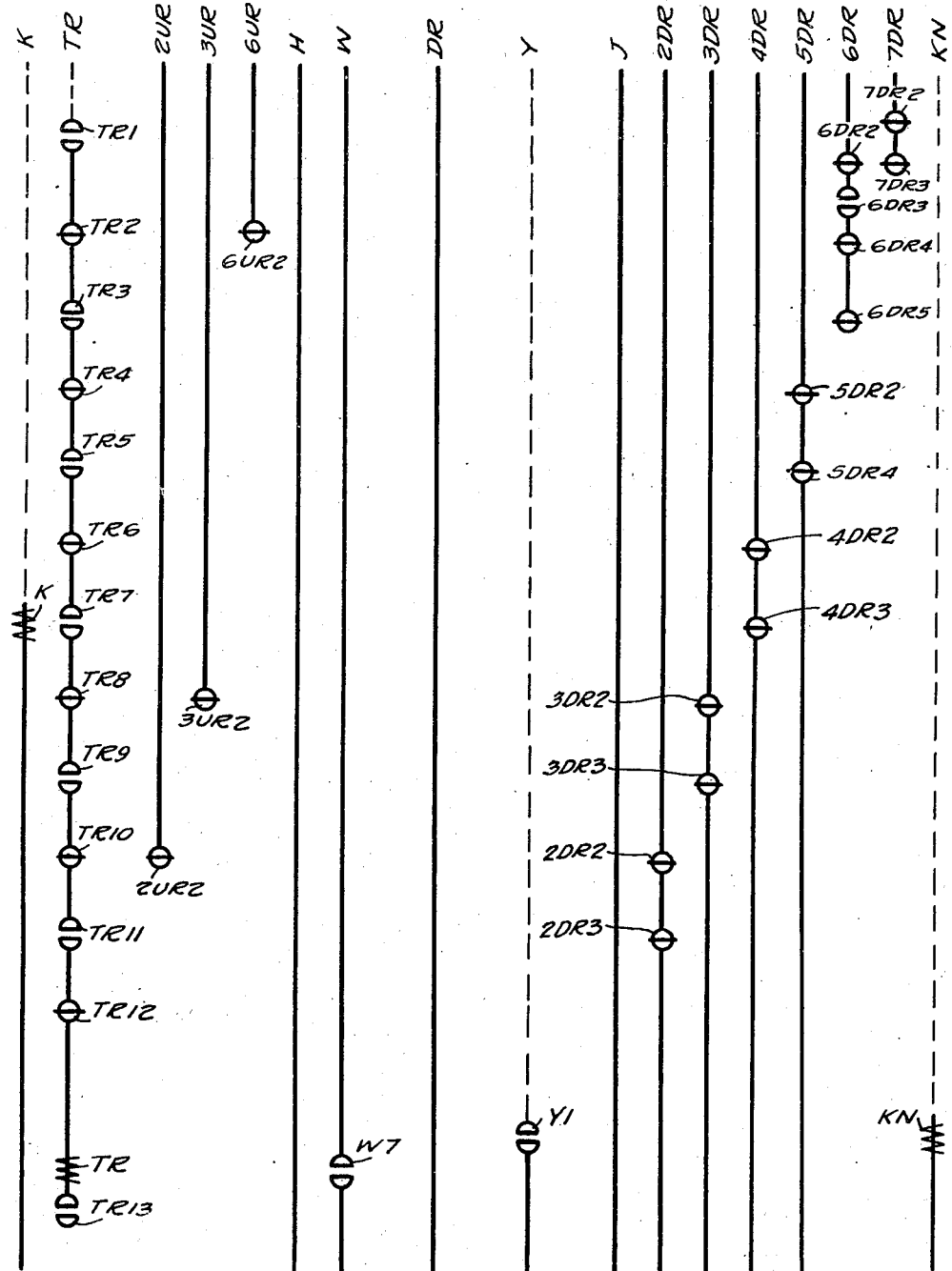

*Apparatus in Fig. 5*

Fig. 5 embodies the high floor call relay K, the no call relay KN and the transfer relay TR together with the operating circuits therefor.

The high floor call relay K of car A is provided for controlling the operation of the high call reversing relay J for that car shown in Fig. 6, in accordance with the existence or non-existence of registered floor calls above it. In order to get a reversal of a car at a call, it is necessary to energize its relay K. This relay is connected to the supply conductor L+5, through either the normal call indicator circuit 50 for the high zone or through the low zone circuit comprising conductor 51 and its auxiliary conductor 51a, depending upon whether relay TR is energized or deenergized. The circuits 50, 51 and 51a are common to all the cars.

The circuit 50 includes back contacts of the up and the down call registering relays arranged in series relation according to the natural sequence of the floors and it is connected at floor points with the contact segments d1, d2, etc., through back contacts of the transfer relay TR. Consequently, when the relay TR is deenergized and car A is traveling on circuit 50, the relay K for car A will not be energized as long as a call exists at any floor above the floor of the contact segment on which the brush 34 rests, but as soon as the brush reaches a segment with no stored calls above it, a circuit for the relay is completed and it is energized.

The circuit 51 includes back contacts of only the down call registering relays for the floors included in the lower zone and they are arranged in series according to the natural sequence of the floors and the circuit is connected at floor points with the contact segments d1, d2, etc., through the front contacts of the relay TR. Therefore, when the quota relay Q and consequently the relay TR are energized, the relay K will not be energized as long as a down call exists at a floor in the low zone above the car but as soon as the car reaches the uppermost registered down call in the low zone, its relay K will be energized to effect its reversal.

The circuit 51 and the contacts therein provide a means for dividing the floors into zones. The number of floors included in the low zone is determined by the number of lower floors having their hall call registering relay contacts included in the low zone circuit 51. The high zone includes the floors above the low zone. If it is desired to include more floors in the low zone, then back contacts of the down hall call registering relays for more floors are included in circuit 51. For instance, if it is desired to change the present system to a low zone of six floors, this can be effected simply by including a pair of back contacts of the down call registering device 6DR for the sixth floor in the low zone circuit 51 (Fig. 5) in a manner similar to the contacts 5DR2 and by eliminating the contacts 6DR2 and 6DR3 from the circuit 51a, so that the low zone cars will reverse in response to a predetermined number of down hall calls at the lower six floors instead of the lower five floors.

In accordance with our invention, the auxiliary circuit 51a is a branch of circuit 51 and it includes back contacts for the down call registering devices (such as 6DR2) for the floors above the low zone. When car A is a low zone car and is transferred to circuits 51 and 51a by the quota device, the relay K will not be energized when car A is in the upper zone as long as a down call exists above it.

When a low zone car leaves the lower terminal on a trip, it starts up on the normal call indicator circuit 50. However, if a sufficient number of down calls are registered in the low zone to operate the quota device, that device causes operation of the transfer relay TR which, in turn, transfers that car from the normal circuit 50 to the low zone circuit 51 and its branch circuit 51a, so that that low zone car will stop at the highest down call in the low zone, or at the lowest down call in the upper zone, or at the next floor in the upper zone, depending upon the position of the car in the hatchway, at the time the quota is filled.

In practicing our invention, we have provided the no-call relay KN for preventing the car from being reversed at the second floor and for causing the car to run straight through to the upper terminal when there are no registered calls above it in the system. The relay KN causes this effect because its coil is included in the lower end of the normal circuit 50 so that when that circuit is closed because no calls are registered, the relay KN is energized to open its contacts KN1 in the circuit of the high call reversal relay J (Fig. 6) and thus prevent that relay from causing reversal of the car in response to relay K becoming energized. Without this relay KN, a car leaving the lower terminal on schedule when no calls are registered, would reverse at the second floor and return to the lower terminal without completing its up trip.

The transfer relay TR is provided for transferring the relay K from control by the normal circuit 50 to control by the low zone circuits 51 and 51a when the car is a low zone car, the quota relay has been energized and the car is moving upwardly. The reversal of the car will be effected in the low zone or in the upper zone, depending upon the position of the up moving car at the time the quota is filled. Conversely, when the quota ceases to exist, the relay TR returns relay K to the control of the normal circuit 50. The relay TR effects this result because it is controlled by the up direction relay W (Fig. 3) and the relay Y (Fig. 6) which, in turn, is controlled by the quota relay Q (Fig. 6).

*Apparatus in Fig. 6*

Fig. 6 illustrates the circuits for the high call reversing relay J, the limiting relay Z, and the quota-adjusting relay Y for each of the cars, together with the quota relay Q which is common to all the cars.

The high call reversing relay J is provided for so preparing the circuits of car A that it will reverse its direction of operation at the floor corresponding to the highest registered down call in the high zone when it is a high zone car and in the low zone or high zone when it is a low zone car. It stops the car by closing its contacts J1 in the circuit of the inductor relays E and F (Fig. 3) and it then reverses the stopped car by opening its contacts J2 in the circuit of the up direction preference relay W (Fig. 3).

The quota relay Q is provided for totalizing the down calls in the low zone. It is common to all the cars and its energized operation is effected by a predetermined number of calls being in existence and the number of low zone cars moving up in the low zone.

The energization of the quota relay is controlled by a plurality of branch circuits, each of which includes a quota resistor, such as R2, and which are controlled by contacts operated by the down floor call relays, such as 4DR, in the low zone, and by a plurality of branch circuits each of which includes a resistor such as R5 and which are controlled by contacts operated by the limit relay Z and the quota adjusting relay Y. The quota relay and the resistors together with their connections are so designed that the relay will be responsive not only to the number of registered down calls that exist in the low zone, but also to the number of low zone cars that are traveling in the up direction.

For example, if car A is conditioned as a low zone car and is going up, its relay Z will be energized after the car passes the first few floors (determined by the number of detached e segments) to close its contacts in the circuit for the quota relay Q. As long as no down call is registered in the low zone, the relay Q will not be energized. If only one down call in the low zone is registered, relay Q will still remain unoperated because sufficient current will not flow through the one resistor to actuate relay Q. As soon as two down calls in the low zone are registered, sufficient current will flow through the two resistors in parallel to actuate relay Q. The resistors and relay Q are normally designed to operate relay Q whenever two down calls in the low zone exist and only one low zone car is going up; to require two more calls for a second car entering the low zone after the first car has been selected and is still in the low zone, and to require four more calls to operate for a third car entering the low zone after the first two cars have been selected and are still in the low zone, in an installation including more low zone floors than can be shown in the drawings. This is effected because operation of the quota relay operates a Y relay and the additional cars operate their Z relays to add additional circuits in parallel with the relay Q.

The limiting relay Z is provided to render the quota relay effective and also in accordance with our invention, in conjunction with detached e segments, to limit the lowest floor at which a reversal can be made by a low zone car in response to the operation of quota relay Q. It has been found that conditions arise occasionally which would reverse a low zone car at the third floor. Under these conditions, only one additional down stop is permitted, namely, at the second floor, and the car will return to the first floor with probably not over four passengers. As such operation is undesirable, we prevent it by disconnecting the feed wires between the circuit 21 and the segments e2 and e3, under which condition relay Z cannot be energized until the fourth floor is reached, and the fourth floor is, therefore, the lowest floor at which the low zone cars can reverse.

As the fifth floor is, for the sake of simplicity in circuits, chosen as the top floor of the low zone in this illustration and description of the invention, it will be understood that it is difficult to satisfactorily illustrate the operation of segments e and the relay Z but it is believed that we have given sufficient information to enable any one skilled in the elevator art to easily construct and install a satisfactory control circuit embodying these features.

The quota-adjusting relay Y is provided for so controlling the branch circuits of the relay Q as to energize that relay in accordance with the number of low zone cars in the low zone and the number of down floor calls registered in the low zone. The relay Y is prepared for action only when the car is conditioned for operation as a low zone car by the closing of contacts 19b and after that it is energized when the quota relay is energized. When energized, relay Y closes its self-holding circuit and remains energized until its car returns to the parking floor and opens its cam switch 26.

With this construction, it will be apparent that, when one car enters the low zone and gets its quota of two calls, if a second car enters the low zone thereafter while the first car is still there, a larger number of down calls must be registered in the low zone before the second car will be reversed. For instance, if car A gets its quota and its Y relay is energized, that relay closes contacts Y2 thereby inserting resistor R5 in parallel with the relay Q so that four down calls must now be registered in the down zone before relay Q will receive enough energy to energize it and effect the reversal of the second car. If two cars are in the lower zone when two or three low zone down calls are registered, the quickest acting relay will be energized and its car will be reversed and the other car will not be reversed until four low zone down calls are registered.

It is believed that the invention may be better understood by assuming an operation of the apparatus and circuits described.

*Operation as high zone car*

The first operation assumed will be that of cars A and B as normal high call reversal cars standing at the lower terminal with the doors (not shown) closed and with no stop calls registered. Under these conditions, the door relay DR, the up direction preference relay W, the no floor call relay KN and the high floor call relay K of car A are in energized condition. The door relay DR is energized because all the doors are closed, thus completing the circuit: L+1, door contacts, DR, L−1. The relay W is energized because the bottom terminal switch 30B is open thus deenergizing relay X which closes its back contact X2. The circuit for relay W extends: L+1, D6, X2, J2, W, 30T, L−1. The relay KN is energized by the circuit 50 in Fig. 5 because no stop calls are registered and all the back contacts in circuit 50 are closed. The relay K is energized because no calls are registered to affect the circuit 50.

Car A is conditioned as a high zone car because its switch 19 has its contacts 19a closed and its contacts 19b open. Car A will now operate on circuit 50 (Fig. 5) but not on circuits 51 or 51a.

With the door closed, the car attendant in car A closes the car switch CS temporarily to start the car upwardly by energizing the up direction switch U and the car running relay M through the following circuit:

L+1, CS, CS1, W1, F1, STU, U, M, 23, L−1.

The energized relay M closes its contacts M1, M2 and M3 and opens its contacts M4 to prepare the control system of car A for operation.

The energized up direction switch U closes its contacts U1, U2, U3, U4 and U5 and opens its contacts U6 to start the car upwardly. The closing of contacts U1 energizes the brake coil to release the brake 15 (Fig. 3). The closing of the contacts U2 and U3 energizes the field winding GF of the generator G by the circuit L+1, U2, GF, U3, R1, L—1. The energization of the field winding GF causes the motor to supply energy to the hoisting motor 14 for operating the drum 11 to move car A upwardly.

The closing of the contacts U4 energizes the high speed relay V by the circuit L+1, U4, VTU, E1, V, L—1. The energized relay V closes its contacts V1 thereby shorting the resistor R1 in the circuit of the generator field winding GF, thus increasing the energization of the field winding GF to cause the motor 14 to move the car upwardly at its normal high speed.

The relay KN is energized because no registered calls exist and it therefore keeps open its contacts KN1 in the circuit of relay J (Fig. 6) thereby preventing car A from reversing at the next floor when no calls exist for it. Therefore, car A will run through to the top terminal unless some stop calls are registered for floors above it.

It will be assumed now that a waiting down passenger at the sixth floor operates the down call button 6D to register a down stop call for that floor. The operation of button 6D energizes the relay 6DR by the circuit L+3, 6D, 6DR, 60, 61, L—3. The energized relay 6DR closes its contacts 6DR1 in its self holding circuit. It also supplies energy to the contact segment g6 to stop the next approaching car which is conditioned to serve it. The operated relay 6DR also opens its contacts 6DR5 in the high call circuit 50 thereby deenergizing the high floor call relay K and the no floor call relay KN. The deenergized relay K opens its contacts K1 and the relay KN closes its contacts KN1 in the circuit of the high call reversal relay J.

It will be assumed that car A moves upwardly in the hatchway on its up trip with no call registered above it except the down call at the sixth floor. As it approaches the sixth floor, its brush 34 engages the energized contact segment d6 and thereby energizes the high floor call relay K by the circuit:

L+5, 7DR3, 6UR2, TR2, d6, 34, K, L—5.

The energized relay K closes its contacts K1 and thereby energizes the high call reversing relay J by the circuit:

L+7, J, H1, K1, W8, KN1, L—7.

The energized relay J closes its contacts J1 (Fig. 3) thereby energizing the slow down inductor relay E and the inductor holding relay G to effect the stopping of the car at the sixth floor. The relay G, in turn, closes its contacts G1 to energize the stopping relay F.

As car A approaches closer to the sixth floor, its inductor relay E comes opposite the up plate UEP for that floor and its contacts E1 are opened, thus deenergizing the high speed relay V. The relay V opens its contacts V1 to insert the resistor R1 in the circuit of the generator field winding GF thereby decreasing the speed of the hoisting motor 14 and thus slowing down the car. As the car approaches still closer to the sixth floor, its stopping relay F comes opposite the up stopping plate UFP for that floor which opens its contacts F1, thereby deenergizing the car running relay M and the up direction switch U. The switch U opens its contacts U1 in the brake circuit and opens its contacts U2 and U3 in the circuit of the generator field winding GF, thus stopping the car and applying the brake to hold it at the sixth floor.

At the same time the contacts J2 of the energized high call reversing relay J are open in one of the parallel circuits of the up direction preference relay W. Therefore, when the contacts M2 of the car running relay M are opened for the sixth floor stop, they open the other parallel circuit for the relay W and thus deenergize it. The deenergized relay W thereupon closes its back contacts W2 which energizes the down preference relay X by the circuit L+1, U6, W2, X, 30B, L—1. The deenergized relay W also opens its contacts W1 in the circuit of the up direction switch U and the down preference relay X closes its contacts X1 in the circuit of the down direction switch D. This prepares the car for down operation and when the attendant closes the starting switch CS, the car will start downwardly.

Assuming now that the attendant closes the car switch CS he thereby energizes the down direction switch D and the car running relay M by the circuit L+1, CS, CS1, X1, F2, STD, D, M, 23, L—1. The energized switch D and the relay M cause the car to move downwardly to the first floor where the arrival of the car opens the lower limit switch STD to deenergize the down direction switch D.

Also, as the car reaches the first floor, it opens its bottom terminal switch 30B to deenergize the down preference relay X which, in turn, closes its back contacts X2 to energize the up direction preference relay W to condition the car for up direction operation.

It is seen by the foregoing description how a normal car operates on an up trip to reverse itself at the highest down call when there are no up calls above it to be answered.

*Operation of low zone car in low zone involving limit relay*

It will be assumed now, in practicing our invention, that the cars A and B are to be conditioned for operation as low zone cars. This is done by moving the switch 19 in car A and the switch B19 in car B to the right. The movement of the switch 19 opens its contacts 19a and closes its contacts 19b. The opening of the contacts 19a disconnects the up stop brush 32 from the stopping relay S so that car A will not respond to any registered up call stops. The closing of the contacts 19b prepares the limit relay Z, the limit circuit 21 and the quota adjusting relay Y for operation. The control apparatus of car A is now conditioned to operate it as a low zone car. The opening of the contacts B19a and the closing of the contacts B19b condition the circuits of car B to cause it to operate as a low zone car. Both cars now operate on circuits 50, 51 and 51a. As long as the quota relay is not operated, the cars operate on circuit 50 but when the quota relay Q is operated, it transfers the first up moving low zone car from circuit 50 to circuits 51 and 51a.

It will be assumed now that cars A and B are standing at the lower terminal ready for operation as low zone cars. Under these circumstances, with the doors closed, the door relay DR, the up direction relay W, the no floor call relay KN and the high floor call relay K of car A are energized. The same relays for car B are also energized for operation.

It will also be assumed that a waiting down passenger at the second floor operates the down call button 2D at the second floor, thereby energizing the down call registering relay 2DR by the circuit L+3, 2D, 2DR, 60, 61, L—3. The energized relay 2DR opens its contacts 2DR3 in the circuit 50 and its contacts 2DR2 in the circuit 51 and closes its contacts 2DR4 in the circuit of the quota relay Q. The opening of contacts 2DR3 deenergizes the no floor call relay KN and the high floor call relay K. The energized relay 2DR also closes its contacts 2DR1 to establish a self holding circuit and energize the stopping segments $g6$ and $Bg6$ to stop the next car conditioned to answer it.

and $Bg6$ to stop the next car conditioned to serve it.

It will be assumed also that a waiting down passenger at the sixth floor presses the down call button 6D at that floor and thereby energizes the down call storing relay 6DR as previously described to energize its stopping segments $g6$ It will be assumed further that a waiting down passenger at the third floor presses the down button 3D for that floor, thereby energizing the down call registering relay 3DR for the third floor which in turn closes its self holding contacts 3DR1 and energizes the contact segments $g3$ and $Bg3$ to stop the next approaching car conditioned to serve it. The energized relay 3DR also opens its contacts 3DR3 in the circuit 50 and 3DR2 in the circuit 51 and closes its contacts 3DR4 in the circuit of the quota relay Q.

It will be assumed now that the attendant in car A closes temporarily its switch CS to start the car upwardly. This energizes the up direction switch U and the car running relay M to start car A upwardly in the manner previously described.

As car A leaves the first floor, it closes its cam switch 26. Inasmuch as the contact segments $e2$ and $e3$ are not connected to the supply conductor L+7, the limit relay Z will not be energized until car A approaches the fourth floor and hence the car will not be reversed at the third floor, even though two down calls (second and third floors) have been registered. Assuming now that car A passes the second and third floor, as it approaches the fourth floor, its brush 40 engages segment $e4$ thereby energizing the limit relay Z by the circuit L+7, 21, $e4$, 40, Z, 27b, 19b, 26, L—7. The operation of the relay Z closes its contacts Z1, thereby energizing the quota relay Q because the circuit of that relay has been prepared for operation by the registration of down calls at the second and third floors in the low zone. This quota of two calls will cause the car to stop at the fourth floor in the low zone. It will be recalled that the quota relay is adjusted to operate when two down calls are registered in the low zone with only one low zone car going up in that zone, but of course it may be designed for operation by any other total of registered calls.

The circuit for the quota relay extends through the parallel resistors R3 and R2 because the contacts 3DR4 and 2DR4 in the quota circuit are closed by reason of the down stored calls at the third floor and the second floor and thence through the coil Q and the contacts Y3 and Z1 to the supply conductor L—7.

The energized relay Q closes its contacts Q1 and Q2 in the circuits of the quota adjusting relays Y and BY for the cars A and B. Relay BY is not energized because its switch B26 is open. The circuit for relay Y extends L+7, Q1, Y, 27b, 19b, 26, L—7. The energized relay Y closes its contacts Y1, Y3 and Y4 and opens its contacts Y2.

The closing of the contacts Y4 establishes a self holding circuit for the relay Y while the opening of its contacts Y3 deenergizes the quota relay Q and restores it to its normal condition. The closing of the contacts Y2 in the branch circuit for the relay Q helps prepare that circuit for again operating that relay if additional calls are registered and additional low zone cars move upwardly while car A is still in the low zone.

The closing of the contacts Y1 energizes the transfer relay TR by the circuit L+5, Y1, W7, TR, L—5. The energized relay TR closes its contacts TR1, TR3, TR5, TR7, TR9 and TR11 leading to the high call circuit 51 and the auxiliary circuit 51a and opens its contacts TR2, TR4, TR6, TR8, TR10 and TR12 leading to the normal call circuit 50 (Fig. 5). This operation transfers the control of the high floor call relay K from the circuit 50 to the circuits 51 and 51a so that it will cause the low zone car A, which now has its quota of down calls, to stop and reverse at the fourth floor in the low zone.

As car A continues its approach to the fourth floor, its brush 34 engages the energized contact segment $d4$ connected to the upper energized section of circuit 51 and thereby establishes a circuit for energizing the relay K as follows:

L+5, 51, 5DR2, TR5, $d4$, 34, K, L—5.

Inasmuch as the contacts 3DR3 for the down call registering relay 3DR at the third floor are open in the normal circuit 50, the no call floor relay KN remains deenergized and its back contacts KN1 in the circuit of the reversing relay J are closed. Thus, as the energized relay K closes its contacts K1 (Fig. 6) it energizes the high call reversing relay J by the circuit previously described. Thereupon the relay J closes its contacts J1 to energize the slow down inductor relay E and the holding relay G which, in turn, closes its contacts G1 to energize the stopping inductor relay F. The inductor relays are operated as the car passes the up slow down plate UEP and stopping plate UFP for the fourth floor as previously described in connection with the sixth floor stop, thereby stopping car A at the fourth floor in response to the quota of registered down calls in the low zone. This is effected because the car A has its quota of two down calls with no other car running up while it is operating upwardly in the low zone.

Car A is now reversed at the fourth floor because the contacts J2 and M2 are opened in the parallel circuits leading to relay W, as previously described, and, when the car attendant closes the switch CS temporarily, the car starts downwardly and stops at the third floor for the down call thereat, then at the second floor for the call thereat and then moves on down to the lower floor where the operation of its limit switches restores it to its normal condition for up operation as a low zone car.

By the foregoing operation, it is seen that a low zone car will stay in the low zone when a predetermined number of down calls are registered for low zone floors and that it will automatically reverse its direction of operation in the low zone when a quota of calls has been registered for lower floors. Thus a low zone car will take care of down calls in the low zone when down traffic therein is heavy and will not, under such circumstances, answer up calls or run up into the high zone. It furthermore illustrates how the limit relay Z and the detached segments e2 and e3 can be used to prevent the car from reversing at the lowermost floors such as the second and third floors.

*Operation of low zone car stopping at highest down call in low zone*

It will be assumed now that cars A and B are low zone cars and are standing at the lower landing. It will also be assumed that a waiting down passenger at the third floor presses the down button 3D at that floor thereby energizing the down call registering relay 3DR for the third floor which, in turn, closes its self-holding contacts 3DR1 and energizes the contact segments g3 and Bg3 to stop the next approaching car conditioned to serve it. The energized relay 3DR also opens its contacts 3DR2 in the circuit 51 and its contacts 3DR3 in the circuit 50 and closes its contacts 3DR4 in the circuit of the quota relay Q.

It will be assumed further that a waiting down passenger at the fourth floor presses the down button 4D at that floor, thereby energizing the down call registering relay 4DR for the fourth floor which, in turn, closes its self-holding contacts 4DR1 and energizes the contact segments g3 and Bg3 to stop the next approaching car conditioned to serve it. The energized relay 4DR also opens its contacts 4DR2 in the circuit 51 and its contacts 4DR3 in the circuit 50 and closes its contact 4DR4 in the circuit of the quota relay Q.

It will be assumed that a waiting down passenger at the sixth floor presses the down call-button 6D at that floor and thereby energizes the down call storing relay 6DR as previously described to energize its stopping segments g6 and Bg6 to stop the next car conditioned to serve it. The energized relay 6DR also opens its contacts 6DR5 in the normal circuit 50 and closes its contacts 6DR3 between circuits 51 and 51a.

It will be assumed now that the attendant in car A temporarily closes its switch CS and thereby starts the car upwardly by energizing the up direction switch U and the car running relay M as previously described.

As car A leaves the first floor, it closes its cam switch 26. As previously described this does not yet effect energization of the limit relay Z. However, as car A leaves the third floor, its brush 40 engages segment e4, thereby energizing the limit relay Z by the circuit previously described. The energized relay Z closes its contacts Z1, thereby energizing the quota relay Q because the circuit of that relay has been prepared for operation by the registration of down calls at the third and fourth floors in the low zone, the two calls constituting the necessary quota to operate the quota relay.

The energized relay closes its contacts Q1 and Q2 in the circuits of the quota adjusting relays Y and BY for the cars A and B and relay Y is energized by the circuit previously described.

The energized relay Y closes its contacts Y1, Y2 and Y4 and opens its contacts Y3. The closing of the contacts Y4 establishes a self-holding circuit for the relay Y and the opening of its contacts Y3 restores the quota relay Q to its normal condition.

The closing of the contacts Y1 energizes the transfer relay TR by the circuit previously described. The energized relay TR closes its contacts TR1, TR3, TR5, TR7, TR9 and TR11 leading to the circuit 51 and its branch circuit 51a and opens its contacts TR2, TR4, TR6, TR8, TR10 and TR12 between the d contacts and the normal circuit 50. This operation transfers the control of the high floor call relay K of car A from the circuit 50 to the circuits 51 and 51a, so that the circuit 51 will cause car A to be reversed at the highest down call in the low zone because the quota has been filled and the quota relay Q has been operated.

As car A continues its approach to the fourth floor, its brush 34 engages the contact segment d4 connected to the upper energized portion of circuit 51 and thereby energizes the relay K now transferred to this circuit, as previously described.

Inasmuch as the contacts 3DR3 and 4DR3 in circuit 50 are open, the no call floor relay KN remains deenergized with its back contacts KN1 in the circuit of the reversing relay J closed. Thus as the energized relay K closes its contacts K1, it energizes the high call reversing relay J by the circuit previously described thereupon the relay J closes its contacts J1 to energize the slow down inductor relay E and the holding relay G which, in turn, energizes the stopping inductor relay F. The inductor relays operate as the car passes the up slow down plate UEP and the stopping plate UFP for the fourth floor, as previously described in connection with the sixth floor stop, thereby stopping car A at the fourth floor in response to the operation of the quota device and the fact that the fourth floor is the highest registered down call in the low zone.

The energized relay J also opens its contacts J2 in the parallel circuit for the relay W, thereby reversing the car as previously described. As soon as the waiting passenger at the fourth floor enters the car, the attendant closes the switch CS temporarily and the car starts downwardly, stopping at the third floor for the down call thereat and then going down to the lower floor where the operation of its limit switches restores it to normal condition for the next up trip.

It will also be observed that although a down call was registered at the sixth floor in the upper zone, that that registered call did not affect the reversal of car at the highest registered down call in the low zone. This was obtained because the quota relay operated the relay Y which operated the transfer relay TR to transfer car A from the normal circuit 50 which included the sixth floor call relay contacts 6DR5 to the low zone circuit 51 which did not include any contacts of the sixth floor call relay 6DR.

*Operation of low zone car into upper zone and operation of by-pass*

In order to illustrate how a low zone car may go out of the lower zone into the upper zone and be reversed at the lowest down call in the upper zone to return to help take care of down calls in the low zone, the following assumed operation is given.

It will be assumed that down calls are registered at the seventh floor, the sixth floor and the second floor. The operation of the button 7D at the seventh floor energizes the relay 7DR by the circuit

L+3, 7D, 7DR, 61, L−3

The energized relay 7DR closes its self-holding contacts 7DR1 and thereby energizes the down contact segment $g7$ and also opens contacts 7DR3 in circuit 50 and 7DR2 in circuit 51a.

The operation of the button 6D for the down call at the sixth floor energizes the relay 6DR by the circuit previously described. The energized relay 6DR closes its contacts 6DR1 to complete its self-holding circuit while it energizes contact segment $g6$ and also opens its contacts 6DR5 in normal circuit 50 and closes contacts 6DR3 between circuits 51 and 51a.

The pressing of the down button 2D at the second floor energizes the call registering relay 2DR as previously described for energizing the contact segment $g2$ and for opening the circuits 50 and 51.

It will be assumed now that both cars A and B are at the lower terminal and that they have been conditioned by operation of their switches 19 and B19 to operate as low zone cars. With car A at the first floor, its up direction preference relay W is energized and, assuming that its door is closed and that the attendant closes the car switch CS, then the car starts on an up trip as previously described. Inasmuch as only one down call (second floor) is now registered in the low zone, the quota relay Q is not operated.

After car A passes out of the low zone by leaving the fifth floor and approaching the sixth floor, a waiting passenger at the third floor presses the down button 3D and thereby energizes the down relay 3DR to register a down stop call at that floor. The relay 3DR closes its self-holding contacts 3DR1 and energizes the down contact segment $g3$ and opens its contacts in the circuits 50 and 51 and closes its contacts in the circuit of the quota relay Q.

Inasmuch as down calls now exist at the second and third floor in the low zone, the quota for the quota relay Q is completed and, inasmuch as the car is above the third floor, the quota relay is energized because sufficient current is flowing through the two parallel resistors R2 and R3 by the closed contacts 2DR4 and 3DR4 to energize it. It will be obvious that the contacts Z1 are closed because relay Z is energized by reason of the fact that car A is above the third floor with its brush 40 bridging the contact segments $e5$ and $e6$. The energized relay Q closes its contacts Q1 and Q2 thereby energizing the quota adjusting relay Y for car A and preparing the circuit of relay BY of car B to be energized. Inasmuch as car B has not yet left the lower terminal, its relay BY remains unenergized. The energized relay Y, as previously described, closes its self-holding contacts Y4, opens its contacts Y3 to deenergize the quota relay Q and closes its contacts Y1 to energize the transfer relay TR for car A.

The energized relay TR opens its back contacts TR12, etc., and closes its front contacts TR11, etc., to transfer the control of relay K of car A from the normal call circuit 50 to the special call indicator circuit 51, so that the relay K will effect the stopping and reversing of car A at the lowest down call in the high zone.

As car A moves on upwardly, its brush 34 engages the energized contact segment $d6$ and thereby energizes relay K to cause the stopping and reversal of car A at the lowest down call in the upper zone, which is at the sixth floor, there being a down call above that at the seventh floor which the low zone car will not now answer. The circuit for the high floor call relay K extends:

L+5, 51, 6DR3, TR1, $d6$, 34, K, L—5.

The energized relay K closes its contacts K1 (Fig. 6) and thereby energizes the high call reversing relay J of car A by the circuit previously described. The relay J, in turn, closes its contacts J1 in the circuit of the slowdown inductor relay E and the inductor holding relay G, thereby energizing those relays to effect the slowing down and stopping of car A at the sixth floor, as previously described. The energized relay J also opens its contacts J2, and, inasmuch as the car running relay M has opened its contacts M2 in the parallel circuit for up direction preference relay W, that relay is deenergized and thereupon closes its back contacts W2 in the circuit for the down direction preference relay X. The deenergized relay W opens its contacts W1 in the circuit of the up direction switch U, and the down direction preference relay X closes its contacts X1 in the circuit of the down direction switch D (Fig. 3) so that the next closing operation of the car switch CS will cause car A to move downwardly.

It will be assumed now that the attendant temporarily closes the car switch CS and that car A moves downwardly. As car A approaches the third floor, its brush 42 engages the energized down contact segment $g3$ for the third floor and thereby completes a circuit for energizing the stopping relay S which closes its contacts S1 to energize the inductor relays to effect the stopping of the car, as previously described. Car A is now stopped at the third floor and takes on the waiting passengers.

It will be assumed now that car A has taken on all the passengers it can carry and that the car attendant presses the by-pass button 27 thereby opening its contacts 27a to prevent energization of the stopping relay S and also opening its contacts 27b to deenergize the relays Z and Y of car A. The deenergization of relays Y and Z opens contacts Y2 and Z1 in the circuit of relay Q so that the means for preventing reversal of the next entering low zone car while car A is still there will be rendered ineffective and the next low zone car will be reversed when two down calls stand registered in the low zone. As the car attendant closes the car switch CS temporarily, car A starts down to the lower terminal and by-passes the down call at the second floor, because its stopping relay S has been rendered ineffective by the operation of the bypass button 27.

By the operation just assumed, it is seen that a low zone car which passes out of the low zone because of the small number of down calls registered in that zone at that time, will, if additional down calls are registered in the low zone while the car is moving upwardly, be stopped and reversed at the lowest down call in the upper zone.

It will also be seen by the foregoing operation that when a low zone car gets the quota of, say, two calls, it closes its relay Y front contacts and opens its relay Y back contacts in the quota relay circuit so as to insert additional resistors, such as R5 or R6 in the circuit around relay Q so that if another low zone car starts up while the first one is operating, sufficient resistors will be in parallel with the quota relay Q to require the registration of four down calls in the low zone while two low zone cars are operating in order to again operate the quota relay Q to cause the reversal of the second low zone car.

Any low zone car leaving the low zone without quota will operate on the high call reversal circuit 50, because its transfer relay TR is not energized. However, if the highest registered call above it is an up call, the low zone car will not stop there but will go one floor beyond it and then stop and reverse, answering any down calls it meets on its down operation. It will not answer the up call while moving up, because its up brush 32 is disconnected by the open contacts 19a of the zone selecting switch 19.

It will also be apparent that any low zone car which enters the upper zone and gets its quota while it is in the upper zone without any calls being registered above it will stop and reverse at the next floor and thus return to answer the down calls in the low zone.

It also will be apparent from the foregoing description and assumed operations that we have provided a flexible control system whereby part of the cars in a bank of elevators can be operated as high call reversal cars and the other part of the cars can be operated as low zone cars, but that the low zone cars will leave the low zone and move into the high zone if they do not have at least a predetermined number of down calls to answer in the low zone, and, if a quota of down calls accumulates in the low zone while the car is in the high zone, it will stop at the lowest down call in the high zone, or if no calls exist in the high zone, it will stop at the next floor, reverse and return to answer the down calls. This is a novel result as it makes the system very flexible and does not limit the cars to only certain floors for operation but causes them to so act normally that the one group serves the upper floors and the other group serves the lower floors but that either group may help out the other group and not be limited only to one zone of operation.

Although we have illustrated and described only one specific embodiment of our invention, it is to be understood that modifications thereof and changes therein may be made without departing from the spirit and scope of the invention.

We claim as our invention:

1. A control system for an elevator car operable in a hoistway past a plurality of floors, means for starting and running said car, call means at each of said floors for stopping said car on its down motion at the associated floor, additional means responsive to said last-mentioned means when said car is on its up motion for preventing said car from running past the highest floor for which a call means is operated, and means responsive to no call means at any floor being in operated condition for rendering ineffective said additional means, whereby said car can run up said hoistway regardless of the fact that there is no high call to be answered.

2. An elevator system comprising a plurality of cars serving a plurality of floors, an operating means for each car, an up call device and a down call device for each intermediate floor for causing the operating means of the cars to stop them thereat when they are in condition to make such stops, means responsive to the operation of call devices at floors above an up moving car for causing its operating means to stop it and reverse it when it arrives at the highest operated call device when that call device is a down call device, and means associated with each car for rendering the high call reversal means ineffective when that car starts on an up trip with no call devices in operated condition.

3. An elevator system comprising a plurality of cars serving a plurality of floors, an operating means for each car, an up call device and a down call device for each intermediate floor for causing the operating means of the cars to stop them thereat when they are in condition to make such stops, a high call reversal means for each car controlled by the operation of the call devices for causing that car to stop and reverse its direction of operation when it starts with operated call devices and arrives at a point where there are no operated call devices above it, and means associated with each car for rendering the high call reversal means associated with that car ineffective when that car starts from the lower terminal with no operated call devices above it.

4. In an elevator control system for a plurality of cars serving a plurality of floors, including an upper terminal floor, a lower terminal floor and intermediate floors, means for dividing the floors into zones including a low zone and a high zone, means for conditioning some of the cars for operation as low zone cars and others for operation as high zone cars, an operating means for each car, an up stop call device and a down stop call device at each of the intermediate floors, means responsive to a predetermined number of operated down call devices for floors in the low zone being in operated condition for causing the operating means for an up running low zone car to stop and reverse its direction of operation to answer the highest operated down call device in the low zone, and means responsive to said car being in the high zone when said predetermined number of down call devices are operated in the low zone for stopping it at the lowest operated down call device in the high zone.

5. In an elevator control system for a plurality of cars serving a plurality of floors, including an upper terminal floor, a lower terminal floor and intermediate floors, means for dividing the floors into zones including a low zone and a high zone, means for selectively conditioning the cars for low zone operation or for high zone operation, an operating means for each car, an up stop call device and a down stop call device at each intermediate floor, and means responsive to operation of a predetermined number of down call devices in the low zone of floors when an up moving low zone car is in the upper zone of floors for causing the operating means of that car to stop it and reverse its direction of operation to cause it to return to serve the operated down stop devices in the low zone of floors.

6. An elevator system comprising a plurality of cars for serving a plurality of floors divided into groups including an upper group and a lower group, control means for each car for starting, running and stopping that car, means for selectively conditioning the cars for low zone or high zone operation, an up call device and a down call device for each floor for registering stop calls for the cars at that floor, said call devices being common to all the cars, a reversing means associated with each car operable on up motion of that car to normally cause its control means to stop it at the highest floor in the upper group having a call device in operated condition, means responsive to a predetermined number of down call devices in operated condition for floors in the lower group for rendering effective the reversing means of a low zone car in said lower group to cause its control means to stop it and reverse its motion to answer the highest floor in the lower group having a down call device in operated condition, and, in the event that said car has moved upward out of said lower group, to stop said car and reverse it at the next floor above it having an operated down call device, regardless of higher floors above it having operated call devices.

7. An elevator system comprising a plurality of cars for serving a plurality of floors divided into zones including a low zone and a high zone, means for selectively conditioning any car as a low zone car or as a high zone car, an operating means for each car, a plurality of down call devices, one at each floor and common to all the cars, for causing the operating means of the cars to stop the cars thereat when they are in condition to make such stops, and means responsive to a predetermined number of the down call devices in the low zone being in operated condition for causing the operating means of an up moving low zone car to stop it and reverse it to answer the highest operated down call device in the low zone or at the lowest operated down call device in the high zone, in accordance with the position of the said up moving low zone car at the time said predetermined number of call devices become operated.

8. An elevator system comprising a plurality of cars for serving a plurality of floors intermediate an upper terminal floor and a lower terminal floor, an operating means for each car, an up call device and a down call device for each of the intermediate floors for causing the operating means of the cars to stop them thereat when they are in condition to make such stops, a normal call-above circuit common to all the cars and controlled by the call devices for the floors, a special call-above circuit common to all the cars and having a low zone portion controlled by only down call devices of a selected number of lower floors constituting a low zone and having an auxiliary portion controlled by down call devices above the low zone, a high call reversal means for each car for effecting reversal of that car at the highest operated call device when it is a down call device if it is connected to the normal circuit and which will effect reversal of its car at the highest operated down call device in the low zone or at the lowest operated down call device at the floors above the low zone when it is connected to the special circuit under predetermined conditions, means for conditioning any car or cars for normally serving the low zone floors, and a quota means responsive to a predetermined number of down call devices in the low zone being in operated condition for disconnecting the high call reversal device of an up-running low zone car from the normal circuit and connecting it to the special circuit.

9. An elevator system comprising a plurality of cars for serving a plurality of floors intermediate an upper terminal floor and a lower terminal floor, a predetermined number of the lower floors being low zone floors, an operating means for each car, an up call device and a down call device for each of the intermediate floors for causing the operating means of the cars to stop them thereat when they are in condition to make such stops, means for conditioning any selected car or cars for normally serving the low zone group of floors, a normal call-above circuit common to all cars and controlled by the call devices for the floors, a special call-above circuit common to all cars and having a low zone portion controlled by the down call devices for the lower zone of floors and having an auxiliary portion controlled by down call devices for floors above the low zone, a high call reversal device for each car, a limit circuit for each car, a limit relay for each car, means responsive to conditioning a car as a low zone car for connecting the limit relay for operation by a the limit circuit by movement of that car, a quota device common to all the cars and connected for operation by a predetermined number of down call devices in the low zone being in operated condition and by operation of the limit relay, a transfer device for each car, a quota adjusting device responsive to operation of the quota device for operating the transfer device of an up moving low zone car, and means responsive to operation of the transfer device of that car for disconnecting the high call reversal means of that car from the normal call-above circuit and connecting it to the special call-above circuit whereby the car will be reversed to answer the highest operated down call device in the low zone while it is in the low zone or while it is above the low zone.

10. An elevator system comprising a plurality of cars for serving a plurality of floors intermediate an upper terminal floor and a lower terminal floor, a predetermined number of the lower floors being low zone floors, an operating means for each car, an up call device and a down call device for each of the intermediate floors for causing the operating means of the cars to stop them thereat when they are in condition to make such stops, means for conditioning any selected car or cars for normally serving the low zone group of floors, a normal call-above circuit controlled by the up and the down call devices and common to all cars, a special call-above circuit controlled by the down call devices for the low zone floors and common to all the cars, an auxiliary call-above circuit controlled by the down call devices for floors above the low zone and common to all the cars, a high call reversal means for each car normally controlled by the normal call above circuit, and a quota means common to all the cars and responsive to a predetermined number of down call devices in the low zone being in operated condition for transferring the high call reversal means of an up moving low zone car from control by the normal circuit to control by the special circuit and the auxiliary circuit to cause said low zone car to be stopped and reversed to answer the highest operated down call device in the low zone when the car is below such device or at the lowest operated down call device above the low zone when the car is above the low zone or at the next floor above the low zone when it is moving up above the low zone with no operated down calls at floors above it.

11. In an elevator control system for a plurality of cars serving a plurality of floors, means for dividing the floors into zones including a low zone group and a high zone group, means for selectively conditioning the cars for low zone operation or for high zone operation, an operating means for each car, a reversing means for each car, up stop call devices and down stop call devices at the floors for causing the operating means to stop the cars thereat when they are in condition to make such stops, a quota device responsive to a predetermined number of operated down call devices at the floors in the low zone for causing the operating and reversing means of an up moving low zone car to stop and reverse it at the highest operated down call device in the low zone, and limiting means associated with each car for preventing operation of the quota device for an up moving low zone car until that car passes a predetermined number of lower floors.

12. An elevator system comprising a plurality of cars for serving a plurality of floors between terminals in hatchways, apparatus for starting each car, an up-call device associated with each floor and common to all the cars, a down-call device associated with each floor and common to all the cars, an up-stopping means for each car responsive to an operated up-call device for causing that car in its upward movement to stop at the floor of that device, manually operable means for each car for rendering the up-stopping means of one or more selected cars ineffective, a down-stopping means for each car responsive to an operated down-car device for causing that car in its down movement to stop at the floor of that device, means responsive to a predetermined number of down-call devices being in operated condition for a predetermined group of the floors for stopping and reversing a selected car while on upward motion to answer the highest floor in said group of floors at which a down-call is in operated condition, means responsive to one selected car being operated to stop on its upward motion for preventing a second selected car from stopping in response to said predetermined number of down-call devices being in operated condition when said second car enters the low zone while the first reversed car is still there, and manual means actuable by the car attendant of the first car for rendering said last-named means ineffective.

13. In an elevator control system for a plurality of cars for serving a plurality of floors, means for dividing the floors into groups including a low zone group and a high zone group, means for selectively conditioning the cars to operate as low zone cars or as high zone cars, an operating means for each car, control means at each floor for causing the operating means of the cars to stop them thereat when they are in condition to make such stops, a normal call-above circuit common to the cars and controlled by the control means at each floor, a low zone call-above circuit common to the cars and controlled by the control means at the floors in the low zone group, a high call reversal means for each car normally connected for control by the normal call-above circuit, means responsive to a predetermined number of operated control means at floors in the low zone group for transferring the high call reversal means of a low zone car moving upwardly from control by the normal call-above circuit to control by the low zone call-above circuit and means responsive to operation of the transfer means of said car for effecting its reversal in the low zone or at the lowest operated down call in the high zone.

14. In an elevator control system for a plurality of cars for serving a plurality of floors, including a parking floor, means for dividing the floors into groups including a low zone group and a high zone group, means for selectively conditioning the cars to operate as low zone cars or as high zone cars, an operating means for each car, control means at each floor for causing the operating means of the cars to stop them thereat when they are in condition to make such stops, a normal call-above circuit common to the cars and controlled by the control means at each floor, a low zone call-above circuit common to the cars, and controlled by the control means at the floors in the low zone group, a high call reversal means for each car normally connected for control by the normal call-above circuit, means responsive to a predetermined number of operated control means at floors in the low zone group for transferring the high call reversal means of a low zone car moving upwardly in the low zone from control by the normal call-above circuit to control by the low zone call-above circuit to effect reversal of that car in the low zone instead of at the highest operated control means in the system, and means responsive to no call means at any floor being in operated condition for preventing reversal of a car leaving the parking floor when it runs one floor, to prevent needless operation of the car.

15. An elevator control system for a plurality of cars for serving a plurality of floors, comprising means for connecting the control system to divide the floors into groups including an upper group and a lower group, an operating means for each car, an up call device and a down call device at each floor for causing the operating means of the cars to stop the cars thereat when they are in condition to make such stops, a quota means responsive to a predetermined number of down call devices for the lower group of floors being in operated condition for controlling the zone dividing means to cause an up moving car in that group to remain in that group of floors, and means responsive to one operation of the quota means for requiring the operation of an additional predetermined number of down call devices for the lower group to cause a second up moving car entering that group thereafter to remain in that group of floors.

HAROLD W. WILLIAMS.
DANILO SANTINI.
MARK L. MOUNT.